(12) United States Patent
Yamakami et al.

(10) Patent No.: US 10,093,835 B2
(45) Date of Patent: Oct. 9, 2018

(54) DOUBLE-SIDED ADHESIVE TAPE

(71) Applicant: DIC Corporation, Tokyo (JP)

(72) Inventors: Akira Yamakami, Kitaadachi-gun (JP);
Hideaki Takei, Kitaadachi-gun (JP);
Yuki Ogawa, Kitaadachi-gun (JP);
Yumi Kamikawa, Kitaadachi-gun (JP);
Takeshi Iwasaki, Kitaadachi-gun (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

(21) Appl. No.: 14/894,236

(22) PCT Filed: Apr. 22, 2014

(86) PCT No.: PCT/JP2014/061249
§ 371 (c)(1),
(2) Date: Nov. 25, 2015

(87) PCT Pub. No.: WO2014/192460
PCT Pub. Date: Dec. 4, 2014

(65) Prior Publication Data
US 2016/0108292 A1    Apr. 21, 2016

(30) Foreign Application Priority Data

May 27, 2013  (JP) ................................ 2013-110862

(51) Int. Cl.
*C09J 7/00*   (2018.01)
*C09J 7/02*   (2006.01)
(Continued)

(52) U.S. Cl.
CPC ............... *C09J 7/0289* (2013.01); *C09J 7/26* (2018.01); *C09J 7/29* (2018.01); *C09J 2201/128* (2013.01);
(Continued)

(58) Field of Classification Search
CPC .. C09J 7/0289; C09J 7/0296; C09J 2467/001; C09J 2201/128; C09J 2475/00; C09J 2203/326; C09J 2400/243; C09J 2201/622
See application file for complete search history.

(56) References Cited

U.S. PATENT DOCUMENTS 5,658,630 A * 8/1997 Shizukuda ............. C09J 7/0207
428/40.1
7,078,093 B2 * 7/2006 Sheridan .................... C09J 7/00
428/343
2013/0017389 A1    1/2013 Tamura et al.

FOREIGN PATENT DOCUMENTS

CN       102268230 A     12/2011
JP    2003-147292 A      5/2003
(Continued)

OTHER PUBLICATIONS

International Search Report dated Aug. 5, 2014, issued in counterpart application No. PCT/JP2014/061249 (1 page).

*Primary Examiner* — Patricia L. Nordmeyer
(74) *Attorney, Agent, or Firm* — Westerman, Hattori, Daniels & Adrian, LLP

(57) ABSTRACT

There is provided a double-sided adhesive tape includes a foam base, a resin film disposed on a surface of the foam base, an adhesive layer disposed on a surface of the resin film, and an adhesive layer disposed on another surface of the foam base. The foam base has a density of 0.45 g/cm³ or less and an interlaminar strength of 10 N/cm or more. The adhesive layer has a 180°-peel adhesion of 10 N/20 mm or more. The 180°-peel adhesion is measured at a peeling speed of 300 mm/min when an adhesive tape including a 25-μm-thick PET base and a 25-μm-thick adhesive layer disposed on the PET base is bonded to an aluminium board at 23° C. and 65% RH by pressing the adhesive tape against the aluminium board with one stroke of a 2-kg roller and (Continued)

subsequently the adhesive tape is left standing for 1 hour at 23° C. and 50% RH.

8 Claims, 1 Drawing Sheet

(51) Int. Cl.
    *C09J 7/26*           (2018.01)
    *C09J 7/29*           (2018.01)

(52) U.S. Cl.
    CPC .... *C09J 2201/622* (2013.01); *C09J 2203/326* (2013.01); *C09J 2400/243* (2013.01); *C09J 2467/001* (2013.01); *C09J 2467/006* (2013.01); *C09J 2475/00* (2013.01)

(56) References Cited

FOREIGN PATENT DOCUMENTS

| JP | 2004-67857 A | 3/2004 |
| JP | 2010-260880 A | 11/2010 |
| JP | 2013-40329 A | 2/2013 |

\* cited by examiner

DOUBLE-SIDED ADHESIVE TAPE

TECHNICAL FIELD

The present invention relates to a double-sided adhesive tape that can be used for fixing various parts of electronic equipment in place.

BACKGROUND ART

Double-sided adhesive tapes have been widely used for, for example, fixing parts of electronic equipment in place. Specifically, the double-sided adhesive tapes have been used for, for example, fixing a protective panel for image displays which constitutes compact electronic equipment such as a portable electronic device, a camera, or a computer to the casing thereof or fixing exterior parts and rigid parts such as a battery to the compact electronic equipment.

A known example of the double-sided adhesive tapes is a double-sided adhesive tape including a flexible foam base with both surfaces thereof being laminated with an adhesive layer (e.g., see PTL 1), which has a small thickness and high conformability to adherends.

The double-sided adhesive tapes have been required to have impact resistance high enough to prevent, even when the portable electronic device was, for example, dropped, adherends such as parts of the portable electronic device from, for example, being detached or separated from the portable electronic device due to the impact.

In addition, due to reductions in the thicknesses and improvement of the functions of the portable electronic devices and the like, thin and expensive parts composed of a tabular rigid body, such as a protection panel constituting an image display, an image-display module, and a thin battery, have been widely used.

Such expensive parts are preferably readily detachable (i.e., separated) from an electronic device or the like when a malfunction or the like occurred in the portable electronic device or the like and, for example, reusable.

Accordingly, double-sided adhesive tapes, which are used for fixing such parts in place, are required to have a characteristic of being readily dismantled into pieces through the application of a certain amount of force to the tape.

Residual objects such as paste constituting the double-sided adhesive tape are likely to remain on the surfaces of the parts (i.e., adherends) that are separated from one another by the application of a force to the tape.

In general, when the parts are reused, such residual objects remaining on the surfaces of the parts are removed manually.

However, when attempt is made to remove a residual object by holding and, for example, pulling the edge of the residual object, the residual object may fail to be removed from the surfaces of the parts to a sufficient degree since a residual object is likely to be, for example, broken when being pulled.

CITATION LIST

Patent Literature

PTL 1: Japanese Unexamined Patent Application Publication No. 2010-260880

SUMMARY OF INVENTION

Technical Problem

Accordingly, an object of the present invention is to provide a double-sided adhesive tape that has suitable impact resistance, enables two or more adherends to be readily dismantled (i.e., separated) from one another when a certain amount of force is applied to the tape, and enables residual objects such as paste which may remain on the surfaces of the adherends to be readily removed.

Solution to Problem

The present invention provides a double-sided adhesive tape including a foam base, a resin film disposed on a surface of the foam base, an adhesive layer disposed on a surface of the resin film, and an adhesive layer disposed on another surface of the foam base. The foam base has a density of 0.45 g/cm$^3$ or less and an interlaminar strength of 10 N/cm or more. The adhesive layer has a 180°-peel adhesion of 10 N/20 mm or more. The 180°-peel adhesion of the adhesive layer is measured at a peeling speed of 300 mm/min when an adhesive tape including a 25-µm-thick polyethylene terephthalate base and a 25-µm-thick adhesive layer disposed on the polyethylene terephthalate base is bonded to an aluminium board under conditions of a temperature of 23° C. and a relative humidity of 65% RH by pressing the adhesive tape against the aluminium board with one stroke of a 2-kg roller, the adhesive tape is left standing for 1 hour under conditions of a temperature 23° C. and a relative humidity of 50% RH, and subsequently the adhesive tape is left standing for 1 hour under conditions of a temperature 23° C. and a relative humidity of 50% RH.

Advantageous Effects of Invention

The above-described double-sided adhesive tape according to the present invention has suitable impact resistance, enables two or more adherends to be readily dismantled (i.e., separated) from one another when a certain amount of force is applied to the tape, and enables residual objects such as paste which may remain on the surfaces of the adherends to be readily removed. Therefore, even when an impact such as a drop impact is given to electronic equipment produced using the double-sided adhesive tape according to the present invention, parts of the electronic equipment are less likely to be detached from the electronic equipment.

Furthermore, when parts of electronic equipment or the like which are bonded to one another using the double-sided adhesive tape are reused, it is possible to readily detach the parts from the electronic equipment or the like through the application of a certain amount of force to the tape without the occurrence of cracking, deformation, and the like of the parts.

In addition, the double-sided adhesive tape enables paste and the like that may remain on the surfaces of the adherends such as parts to be readily removed.

Thus, the double-sided adhesive tape according to the present invention can be suitably used for fixing parts of compact electronic equipment or the like in place and, in particular, for fixing thin, tabular rigid parts, such as a protection panel, an image display module, and a thin battery that constitute an information display of compact electronic equipment such as a portable electronic device in place.

DESCRIPTION OF EMBODIMENTS

Figure 1:
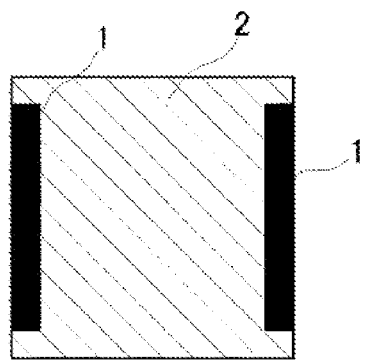
FIG. 1 is a conceptual diagram illustrating a test specimen used in an impact resistance test, which is viewed from the top surface of the test specimen.

A double-sided adhesive tape according to the present invention includes a foam base, a resin film disposed on a surface of the foam base, an adhesive layer disposed on a surface of the resin film, and an adhesive layer disposed on another surface of the foam base.

The foam base has a density of 0.45 g/cm$^3$ or less and an interlaminar strength of 10 N/cm or more. The adhesive layer has a 180°-peel adhesion of 10 N/20 mm or more. The 180°-peel adhesion of the adhesive layer is measured at a peeling speed of 300 mm/min when an adhesive tape including a 25-μm-thick polyethylene terephthalate base and a 25-μm-thick adhesive layer disposed on the polyethylene terephthalate base is bonded to an aluminium board under conditions of a temperature of 23° C. and a relative humidity of 65% RH by pressing the adhesive tape against the aluminium board with one stroke of a 2-kg roller, the adhesive tape is left standing for 1 hour under conditions of a temperature 23° C. and a relative humidity of 50% RH, and subsequently the adhesive tape is left standing for 1 hour under conditions of a temperature 23° C. and a relative humidity of 50% RH.

[Foam Base]

The foam base constituting the double-sided adhesive tape according to the present invention is described below.

The foam base has a density of 0.45 g/cm$^3$ or less. The foam base more preferably has a density of 0.1 to 0.45 g/cm$^3$ and further preferably has a density of 0.15 to 0.42 g/cm$^3$ in order to produce a double-sided adhesive tape having a higher capability of being readily dismantled.

The foam base has an interlaminar strength of 10 N/cm or more. The foam base preferably has an interlaminar strength of 10 to 50 N/cm and further preferably has an interlaminar strength of 10 to 25 N/cm in order to produce a double-sided adhesive tape that has a higher capability of being readily dismantled and higher impact resistance and that enables residual objects such as paste, which may remain on the surfaces of adherends when the foam base is dismantled, to be readily removed.

The interlaminar strength of the foam base is determined by the following method.

A 50-μm-thick adhesive layer having high adhesion is bonded onto each surface of the foam base, and the resulting laminated body is aged at 40° C. for 48 hours. Thus, a double-sided adhesive tape used for measuring interlaminar strength is prepared. The term "high adhesion" used herein refers to adhesion high enough to prevent the adhesive layer from being separated from adherends and the foam base even under the high-speed peeling test described below.

One of the adhesive layers constituting the double-sided adhesive tape used for measuring interlaminar strength is lined with a polyester film having a thickness of 25 μm. The resulting double-sided adhesive tape is cut to a dimension of 1 cm by 15 cm in the width and machine directions of the foam base, respectively, to prepare an adhesive tape. The adhesive tape is pressure-bonded to a polyester film having a thickness of 50 μm, a width of 3 cm, and a length of 20 cm at 23° C. and 50% RH with one stroke of a 2-kg roller. The resulting laminated body is left standing at 60° C. for 48 hours and subsequently left standing at 23° C. for 24 hours.

Under conditions of 23° C. and 50% RH, the 50-μmm-thick-polyester-film-side surface side of the adhesive tape is fixed to a fixture of a high-speed peeling testing machine, and the 25-μm-thick polyester film is pulled at 90 degrees at a tensile speed of 15 m/min to tear the foam base. The maximum strength that occurs while the foam base is torn is measured.

The 25%-compressive strength of the foam base used in the present invention is preferably 500 kPa or less, is more preferably 10 to 300 kPa, is more preferably 10 to 200 kPa, is further preferably 30 to 180 kPa, and is particularly preferably 50 to 150 kPa. Limiting the compressive strength of the foam base to be within the above range enables a double-sided adhesive tape having suitable impact resistance, a capability of being dismantled, and suitable conformability to adherends to be produced.

The 25%-compressive strength of the foam base can be measured in accordance with JIS K6767. Specifically, the double-sided adhesive tape is cut into square pieces of 25 per side, and the pieces are stacked on top of one another to form a multilayer until the thickness of the multilayer reaches about 10 mm. The multilayer is interposed between stainless steel boards having an area larger than the area of the pieces of the double-sided adhesive tape and subsequently compressed at 23° C. at a speed of 10 mm/min. Then, the strength of the multilayer is measured when the thickness of the multilayer is reduced by about 2.5 mm (which corresponds to 25% of the original thickness).

The tensile strengths of the foam base in the machine and width directions are not particularly limited, but are preferably 500 to 1300 N/cm$^2$ and are more preferably 600 to 1200 N/cm$^2$. The tensile elongation of the foam base which occurs when the foam base is ruptured in a tensile test is preferably, but not particularly limited to, 100% to 1200%, is more preferably 100% to 1000%, and is further preferably 200% to 600% in the machine direction. Using a foam base having a tensile strength and a tensile elongation that fall within the above-described ranges enables degradations of formability of the adhesive tape and ease of bonding to be limited even when a foamed, flexible base is used. In addition, it is possible to readily remove the pieces of the dismantled adhesive tape.

The tensile strengths of the foam base in the machine and width directions can be measured in accordance with JIS K6767. Specifically, the double-sided adhesive tape which has been cut into a piece having a gage line length of 2 cm and a width of 1 cm is subjected to a tensile testing machine TENSILON under conditions of 23° C. and 50% RH at a tensile speed of 300 mm/min. The maximum strength that occurs in the measurement is considered to be the tensile strength of the foam base.

The average bubble diameters of the foam base in the machine and width directions are preferably, but not particularly limited to, 10 to 500 μm, are more preferably 30 to 400 μm, and are further preferably 50 to 300 μm. Using a foam base having machine-direction and width-direction average bubble diameters that fall within the above range enables a double-sided adhesive tape having high adhesion to adherends and suitable impact resistance to be produced.

The ratio of the machine-direction average bubble diameter of the foam base to the width-direction average bubble diameter of the foam base (i.e., machine-direction average bubble diameter/width-direction average bubble diameter) is preferably, but not particularly limited to, 0.2 to 4, is more preferably 0.3 to 3, and is further preferably 0.4 to 1. Limiting the ratio of machine-direction average bubble diameter to width-direction average bubble diameter to be within the above range reduces the degree of unevenness in flexibility and the degree of unevenness in tensile strength in the machine and width directions of the foam base.

The thickness-direction average bubble diameter of the foam base used in the present invention is preferably 3 to 100 µm, is more preferably 5 to 80 µm, and is further preferably 5 to 50 µm. The thickness-direction average bubble diameter of the foam base is preferably ½ or less and is preferably ⅓ or less of the thickness of the foam base. Limiting the thickness-direction average bubble diameter of the foam base and the ratio of the thickness-direction average bubble diameter to the thickness of the foam base to be within the above range increases ease of dismantling, enhances impact resistance, achieves high adhesion even when rigid bodies are bonded to one another, and enables desired density and strength of the foam base to be achieved.

The ratio of the machine-direction average bubble diameter of the foam base to the thickness-direction average bubble diameter of the foam base (i.e., machine-direction average bubble diameter/thickness-direction average bubble diameter) and the ratio of the width-direction average bubble diameter of the foam base to the thickness-direction average bubble diameter of the foam base (i.e., width-direction average bubble diameter/thickness-direction average bubble diameter) are both preferably 1 or more, are both more preferably 3 or more, and are both further preferably 4 to 25.

Using a foam base that has the above-described average-bubble-diameter ratios enables a double-sided adhesive tape having high flexibility in the thickness direction and further high adhesion even when adherends are rigid bodies to be produced.

The width-direction average bubble diameter, machine-direction average bubble diameter, and thickness-direction average bubble diameter of the foam base can be measured in the following manner.

The foam base is cut to a size of 1 cm in both width and machine directions.

A cross section of the foam base which is taken in the width or machine direction is observed using a digital microscope (product name "KH-7700", produced by HYRAX Co., Ltd.) at a 200-fold magnification. At this time, the observation is made all over the length of the cross section of the foam base in the thickness direction. In this observation, the diameters of all the bubbles that are present within a range of the cross section which has a length of 2 mm in the machine or width direction are measured. Subsequently, another 2-mm-long range of the cross section is selected and, in this manner, the diameters of all the bubbles that are present within 2-mm-long ranges are measured at 10 random positions.

The average of the diameters of the bubbles measured is considered to be the average bubble diameter.

A foam base having a closed cell structure is preferably used in order to prevent intrusion of water from the cross sections of the foam base and discharge of dust from occurring in an effective manner. The bubbles that define the closed cell structure preferably have a shape such that the average bubble diameter of the bubbles which is measured in the machine direction, the width direction, or both machine and width directions is larger than the average bubble diameter of the bubbles which is measured in the thickness direction in order to produce a double-sided adhesive tape having suitable conformability to adherends and a suitable cushioning property.

The thickness of the foam base is preferably 250 µm or less, is more preferably 50 to 250 µm, is further preferably 80 to 200 µm, and is particularly preferably 100 to 150 µm in order to produce a double-sided adhesive tape having further suitable impact resistance and ease of dismantling even when the thickness of the double-sided adhesive tape is small.

The density, interlaminar strength, compressive strength, and tensile strength of the foam base can be controlled appropriately by changing the type of material used for preparing the foam base and the foam structure.

Examples of a material of the foam base include polyolefin foams produced from a polyolefin such as polyethylene, polypropylene, an ethylene-propylene copolymer, and an ethylene-vinyl acetate copolymer, polyurethane foams, acrylic foams, and other rubber foams.

Among these foams, polyolefin foams are preferably used as a material of the foam base in order to achieve high conformability to the surface irregularities of adherends and increase ease of preparing a foam base having a closed cell structure which has suitable impact resistance.

The polyolefin foam base is preferably a foam base prepared using a polyethylene resin in order to achieve a relatively uniform thickness and further high flexibility.

The content of the polyethylene resin in the polyolefin resin is preferably 40% by mass or more, is more preferably 50% by mass or more, is further preferably 60% by mass or more, and is particularly preferably 100% by mass.

Examples of the polyethylene resin that can be used for producing the polyolefin foam include linear low-density polyethylene, low-density polyethylene, medium-density polyethylene, high-density polyethylene, an ethylene-α-olefin copolymer containing 50% by mass or more of ethylene, and an ethylene-vinyl acetate copolymer containing 50% by mass or more of ethylene. These polyethylene resins may be used alone or in combination of two or more.

Examples of an α-olefin constituting the ethylene-α-olefin copolymer include propylene, 1-butene, 1-pentene, 4-methyl-1-pentene, 1-hexene, 1-heptene, and 1-octene.

Examples of the polypropylene resin include, but are not particularly limited to, polypropylene and a propylene-α-olefin copolymer containing 50% by mass or more of propylene. These polypropylene resins may be used alone or in combination of two or more. Examples of an α-olefin constituting the propylene-α-olefin copolymer include ethylene, 1-butene, 1-pentene, 4-methyl-1-pentene, 1-hexene, 1-heptene, and 1-octene.

Among the above polyethylene resins, it is preferable to use a polyethylene resin having a narrow molecular-weight distribution which is produced using, as a polymerization catalyst, a metallocene compound including a tetravalent transition metal. In the polyethylene resin produced by the above-described method, it is possible to control the proportions of the copolymerization components to be substantially consistent regardless of the molecular weight of the polyethylene resin. As a result, a polyolefin foam in which crosslinks are substantially uniformly present can be produced. The polyolefin foam in which crosslinks are substantially uniformly present can be readily stretched. Furthermore, the thickness of such a polyolefin foam can be readily controlled to be uniform over the entire polyolefin foam.

Polyolefin resins prepared by other production methods, that is, polyolefin resins other than the polyethylene resin produced using a metallocene compound including a tetravalent transition metal, may also be used as a polyethylene resin.

The polyolefin foam base may include a crosslinked structure. In the case where a polyolefin foam is produced by foaming a polyolefin resin sheet using a pyrolysis-type foaming agent or the like, it is preferable to design the polyolefin foam base such that a crosslinked structure is formed in the polyolefin foam base. The degree of crosslinking is preferably 5% by mass to 60% by mass and is more preferably 10% by mass to 55% by mass in order to reduce the occurrence of roughening of the surface of the foam base which may be caused due to broken bubbles formed in the vicinity of the surface of the foam base and further increase the adhesion of the foam base to the adhesive layer and impact resistance.

The degree of crosslinking can be measured by the following method. A set of five foam bases having a size of 40 mm×50 mm is used as a sample, and the total mass ($G1$) of the sample is measured. After the sample is immersed in xylene at 120° C. for 24 hours, a component insoluble in xylene is filtered off using a 300-mesh metal screen. After drying is performed at 110° C. for 1 hour, the mass ($G2$) of the residue is measured. The content of the component insoluble in xylene which is calculated using the following formula is considered to be the degree of crosslinking.

Degree of Crosslinking(mass %)=($G2/G1$)×100

A method for producing the polyolefin foam is not particularly limited. The polyolefin foam can be produced by, for example, a step in which a polyolefin resin composition that includes a polyolefin resin containing 40% by weight or more of a polyethylene resin produced using, as a polymerization catalyst, a metallocene compound including a tetravalent transition metal, that includes a pyrolysis-type foaming agent and a foaming adjuvant, that includes a colorant used for coloring the foam in black, white, or the like, and the like is supplied into an extruder and the resulting mixture is melt-kneaded and then extruded into a sheet-like shape to prepare a polyolefin resin sheet; a step in which crosslinks are formed in the polyolefin resin sheet; a step in which the polyolefin resin sheet is foamed; and a step in which the foamed sheet is molten or softened and stretched in the machine direction, the width direction, or both machine and width directions in order to form a stretched foamed sheet. The step of stretching the foamed sheet is optional and may be repeated plural times.

The pyrolysis-type foaming agent is not particularly limited and any pyrolysis-type foaming agent used for producing a foam in the related art may be used. Examples of such a pyrolysis-type foaming agent include azodicarbonamide, N,N'-dinitroso pentamethylene tetramine, and p-toluenesulfonyl semicarbazide. In particular, azodicarbonamide is preferably used. These pyrolysis-type foaming agents may be used alone or in combination of two or more.

The amount of the pyrolysis-type foaming agent may be determined appropriately depending on the expansion ratio of the polyolefin foam, is preferably 1 to 40 parts by mass, and is more preferably 1 to 30 parts by mass relative to 100 parts by mass of the polyolefin resin in order to increase ease of controlling the expansion ratio, tensile strength, compression recovery ratio, and the like to be within desired ranges.

Crosslinks can be formed in the polyolefin foam base by, for example, a method in which the polyolefin foam base is irradiated with ionizing radiation; or a method in which an organic peroxide is added to a polyolefin resin composition and a polyolefin foam base produced using the polyolefin resin composition is heated to decompose the organic peroxide. These methods may be used in combination.

Examples of the ionizing radiation include an electron beam, $\alpha$-rays, $\beta$-rays, and $\gamma$-rays. The dose of the ionizing radiation can be controlled appropriately such that the degree of crosslinking in the polyolefin foam base falls within the above preferable range and is preferably 5 to 200 kGy. The irradiation of the polyolefin foam base with ionizing radiation is preferably performed such that both surfaces of the polyolefin foam base are irradiated with ionizing radiation and is more preferably performed such that both surfaces of the polyolefin foam base are irradiated with ionizing radiation in the same dose in order to achieve a uniform foam state.

Examples of the organic peroxide include 1,1-bis(t-butylperoxy)3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butyl peroxide, t-butyl cumyl peroxide, dicumyl peroxide, $\alpha$, $\alpha'$-bis(t-butylperoxy-m-isopropyl)benzene, 2,5-dimethyl-2,5-di(t-butylperoxy)hexane, 2,5-dimethyl-2,5-di(t-butylperoxy)hexyne-3, benzoyl peroxide, cumyl peroxyneodecanate, t-butyl peroxybenzoate, 2,5-dimethyl-2,5-di(benzoylperoxy)hexane, t-butylperoxy isopropyl carbonate, and t-butylperoxy allyl carbonate. These organic peroxides may be used alone or in combination of two or more.

The amount of the organic peroxide is preferably 0.01 to 5 parts by mass and is more preferably 0.1 to 3 parts by mass relative to 100 parts by mass of the polyolefin resin in order to reduce the amount of residue resulting from decomposition of the organic peroxide.

A method for foaming the polyolefin resin sheet is not particularly limited. The polyolefin resin sheet may be foamed by, for example, a method in which the polyolefin resin sheet is heated using hot air, a method in which the polyolefin resin sheet is heated using infrared radiation, a method in which a salt bath is used, or a method in which an oil bath is used. These methods may be used in combination. In particular, a method in which the polyolefin resin sheet is heated using hot air and a method in which the polyolefin resin sheet is heated using infrared radiation are preferably employed in order to reduce the difference in appearance between the front and rear surfaces of the polyolefin foam base.

The foam base may optionally be stretched. Stretching of the foam base may be performed after the foam base is prepared by foaming the polyolefin resin sheet or while the polyolefin resin sheet is foamed.

In the case where the foam base is stretched after the foam base is prepared by foaming the polyolefin resin sheet, stretching of the foam base may be performed subsequent to foaming of the polyolefin resin sheet without cooling the foam base while the foam base is in a molten state created when the foam base was foamed. Alternatively, stretching of the foam base may be performed when the foam base, which has once been cooled, is reheated to be in a molten or softened state.

The term "molten state" of the foam base used herein refers to a state of the foam base in which the foam base is heated to a temperature equal to or higher than the melting point of a polyolefin resin constituting the foam base. The term "softening" of the foam base used herein refers to a state of the foam base in which the foam base is heated to a temperature that is equal to or higher than the softening point of a polyolefin resin constituting the foam base and that is less than the melting point of the polyolefin resin. Stretching the above-described foam base causes bubbles included in the foam base to be stretched and deformed in a predetermined direction, which enables a polyolefin foam including bubbles having an aspect ratio that falls within the predetermined range to be produced.

The foam base is preferably stretched in the machine direction, the width direction, or both machine and width directions of the extra-long polyolefin resin sheet. In the case where the foam base is stretched in both machine and width directions, the foam base may be stretched in both machine and width directions at the same time or may alternatively be stretched in each direction at different times.

The above-described foam base can be stretched in the machine direction by, for example, a method in which a speed (i.e., coiling speed) at which the extra-long polyolefin resin sheet that has been foamed is coiled while being cooled is set to be higher than a speed (i.e., feeding speed) at which the extra-long polyolefin resin sheet is fed into a foaming process; or a method in which a speed (i.e., coiling speed) at which the foam base is coiled is set to be higher than a speed (i.e., feeding speed) at which the foam base is fed into a stretching process.

The polyolefin resin sheet is likely to be expanded in the machine direction due to foaming thereof. Therefore, in the case where a foam base prepared using the polyolefin resin sheet is stretched in the machine direction, the feeding speed and coiling speed of the foam base are preferably controlled with an increase in the size of the polyolefin resin sheet in the machine direction due to foaming of the polyolefin resin sheet taken into account such that the amount of elongation of the polyolefin resin sheet in the machine direction is equal to or more than the increase in the size of the polyolefin resin sheet due to foaming.

The foam base is preferably stretched in the width direction by holding both edges of the foam base in the width direction using a pair of holding members and gradually moving the pair of the holding members in different directions such that the distance therebetween is increased. The polyolefin resin sheet is likely to be expanded in the width direction due to foaming thereof. Therefore, in the case where the foam base is stretched in the width direction, an adjustment is preferably made with an increase in the size of the polyolefin resin sheet in the width direction due to foaming of the polyolefin resin sheet taken into account such that the amount of elongation of the polyolefin resin sheet in the width direction is equal to or more than the increase in the size of the polyolefin resin sheet due to foaming thereof.

The stretching ratio of the foam base in the machine direction is preferably 1.1 to 5 times and is more preferably 1.3 to 3.5 times. The stretching ratio of the foam base in the width direction is preferably 1.2 to 4.5 times and is more preferably 1.5 to 3.5 times. Using a foam base prepared at the above stretching ratios enables high flexibility and high tensile strength to be maintained.

The foam base may optionally be colored in order to produce a double-sided adhesive tape that is excellent in design and has a light blocking effect, a shielding property, light reflectivity, lightfastness, and the like. When the foam base is colored, known colorants may be used alone or in combination of two or more.

A foam base colored in black is preferably used in order to impart a light blocking effect, a shielding property, and lightfastness to the double-sided adhesive tape.

Examples of the black colorant include carbon black, graphite, copper oxide, manganese dioxide, aniline black, perylene black, titanium black, cyanine black, active carbon, ferrite, magnetite, chromium oxide, iron oxide, molybdenum disulfide, a chromium complex, complex-oxide-based black coloring matter, and anthraquinone-based organic black coloring matter. Among these colorants, carbon black is preferably used from the viewpoints of cost, availability, insulating property, and heat resistance high enough to withstand temperatures at which a step of extruding the polyolefin resin composition and a heating-foaming step are conducted.

A foam base colored in white is preferably used in order to produce a double-sided adhesive tape that is excellent in design and has light reflectivity.

Examples of the white colorant include inorganic white colorants such as titanium oxide, zinc oxide, aluminium oxide, silicon oxide, magnesium oxide, zirconium oxide, calcium oxide, tin oxide, barium oxide, cesium oxide, yttrium oxide, magnesium carbonate, calcium carbonate, barium carbonate, zinc carbonate, aluminium hydroxide, magnesium hydroxide, calcium hydroxide, zinc hydroxide, aluminium silicate, calcium silicate, barium sulfate, calcium sulfate, barium stearate, Chinese white, talc, silica, alumina, clay, kaolin, titanium phosphate, mica, gypsum, white carbon, diatomaceous earth, bentonite, lithopone, zeolite, and sericite; and organic white colorants such as silicone resin particles, acrylic resin particles, urethane resin particles, and melamine resin particles. Among these colorants, titanium oxide, aluminium oxide, and zinc oxide are preferably used from the viewpoints of cost, availability, color tone, and heat resistance high enough to withstand temperatures at which a step of extruding the polyolefin resin composition and a heating-foaming step are conducted.

The foam base may optionally include, as needed, publicly known plasticizers, antioxidants, foaming adjuvants such as zinc oxide, bubble-core controlling agents, heat stabilizers, flame retardants such as aluminium hydroxide and magnesium hydroxide, antistatic agents, and fillers such as hollow balloons or beads made of glass or plastic, a metal powder, a metal compound, an electrically conductive filler, and a thermally conductive filler.

The colorant, the pyrolysis-type foaming agent, the foaming adjuvant, and the like are preferably prepared in the form of a masterbatch using a polyolefin resin or another thermoplastic resin miscible with the polyolefin resin in order to prevent poor appearance such as inconsistencies in color density and faulty foaming such as excessive foaming and no-foaming from occurring.

The foam base may optionally be subjected to a surface treatment such as a corona treatment, a flame treatment, a plasma treatment, a hot-air treatment, an ozone treatment, an ultraviolet treatment, or an adhesion-increasing treatment in order to increase the adhesion of the foam base to the adhesive layer and the like.

The surface of the foam base which has been subjected to the surface treatment preferably has a wetting index of 36 mN/m or more, more preferably has a wetting index of 40 mN/m or more, and further preferably has a wetting index of 48 mN/m or more, the wetting index being measured using a wetting reagent, in order to achieve high adhesion of the foam base to the adhesive layer and the like.

[Resin Film]

The resin film constituting the double-sided adhesive tape according to the present invention is described below.

The resin film serves as a support used for, when two or more adherends bonded together using the double-sided adhesive tape according to the present invention are separated from one another, removing residual objects, that is, portions of the double-sided adhesive tape, which remain on the surfaces of the adherends. For example, when attempt is made to separate the two or more adherends bonded together from one another, a portion of the foam base constituting the double-sided adhesive tape is dismantled into pieces. At this time, portions of the adhesive layer, the resin film, and the foam base may remain on portions of the adherends. It is possible to readily remove the residual objects from the surfaces of the adherends by pulling the resin film when attempt is made to remove the residual objects from the adherends.

Examples of the resin film include the following resin film bases: polyester resin films such as a polyethylene terephthalate film, a polybutylene terephthalate film, and a polyethylene naphthalate film, a polyethylene film, a polypropylene film, a cellophane film, a diacetylcellulose film, a triacetylcellulose film, an acetylcellulose butyrate film, a polyvinyl chloride film, a polyvinylidene chloride film, a polyvinyl alcohol film, an ethylene-vinyl acetate copolymer film, a polystyrene film, a polycarbonate film, a polymethylpentene film, a polysulfone film, a polyetheretherketone film, a polyethersulfone film, a polyetherimide film, a polyimide film, a fluorine resin film, a nylon film, and an acrylic resin film.

The resin film may optionally be subjected to a surface treatment such as a corona treatment, a flame treatment, a plasma treatment, a hot-air treatment, an ozone treatment, a ultraviolet treatment, or a treatment in which an adhesion-increasing agent is applied to the resin film in order to further increase the adhesion of the resin film to the foam base, the adhesive layer, and the like.

The thickness of the resin film is preferably 0.5 to 20 μm, is more preferably 2 to 20 μm, is further preferably 3 to 16 μm, and is particularly preferably 3.5 to 15 μm. Using a resin film having a thickness that falls within the above range enables a double-sided adhesive tape having suitable impact resistance, ease of dismantling, and suitable conformability to adherends to be produced.

The resin film can be bonded to the foam base using, for example, a bonding agent containing a urethane resin, a bonding agent containing an acrylic resin, or a bonding agent containing a polyester resin. Among these bonding agents, a urethane bonding agent containing a urethane resin is preferably used, a bonding agent containing a polyether-based urethane resin and a bonding agent containing a polyester-based urethane resin are more preferably used, and a urethane bonding agent containing a polyether-based urethane resin is particularly preferably used in order to achieve high initial bonding force and perform bonding at a relatively low temperature by a dry lamination method.

The urethane bonding agent may contain a urethane resin and a solvent such as an organic solvent or water.

The urethane resin contained in the bonding agent can be produced by reacting a polyisocyanate with a polyol.

Examples of the polyisocyanate include aromatic polyisocyanates, aliphatic polyisocyanates, and polyisocyanates having an alicyclic structure, such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, naphthalene diisocyanate, xylylene diisocyanate, and tetramethylxylylene diisocyanate.

Examples of the polyol capable of reacting with the polyisocyanate include polyether polyols, polyester polyols, and polycarbonate polyols. In particular, polyether polyols are preferably used.

The polyether polyol can be produced by, for example, addition polymerization of an alkylene oxide using, as initiators, one or more compounds including two or more active hydrogen atoms.

Examples of the initiators include ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, and trimethylolpropane.

Examples of the alkylene oxide include ethylene oxide, propylene oxide, butylene oxide, styrene oxide, epichlorohydrin, and tetrahydrofuran.

Examples of the polyester polyol include aliphatic polyester polyols produced by an esterification reaction of a low-molecular-weight polyol with a polycarboxylic acid; aromatic polyester polyols; polyesters produced by ring-opening polymerization of a cyclic ester compound such as ε-caprolactone or γ-butyrolactone; and copolyesters of these polyester polyols.

Examples of the low-molecular-weight polyol that can be used for producing the polyester polyol include ethylene glycol, 1,2-propanediol, 1,3-butanediol, 1,4-butanediol, 1,6-hexanediol, 1,4-cyclohexanedimethanol, 3-methyl-1,5-pentanediol, neopentyl glycol, diethylene glycol, dipropylene glycol, glycerin, and trimethylolpropane. These low-molecular-weight polyols may be used alone or in combination of two or more. For example, ethylene glycol, 1,2-propanediol, 1,3-butanediol, or 1,4-butanediol is preferably used in combination with 3-methyl-1,5-pentanediol, or neopentyl glycol.

Examples of the polycarboxylic acid include succinic acid, adipic acid, sebacic acid, dodecanedicarboxylic acid, azelaic acid, cyclopentanedicarboxylic acid, cyclohexanedicarboxylic acid, terephthalic acid, isophthalic acid, phthalic acid, naphthalenedicarboxylic acid, anhydrides of these polycarboxylic acids, and ester-forming derivatives of these polycarboxylic acids. In particular, aliphatic polycarboxylic acids such as adipic acid are preferably used. In the case where a polyester polyol having the aromatic ring structure is used, examples of the polycarboxylic acid include aromatic polycarboxylic acids such as terephthalic acid, isophthalic acid, phthalic acid, and naphthalenedicarboxylic acid.

Examples of the polycarbonate polyol that can be used as a polyol include a polycarbonate polyol produced by reacting a carbonic ester with a polyol and a polycarbonate polyol produced by reacting phosgene with bisphenol A or the like.

Examples of the carbonic ester include methyl carbonate, dimethyl carbonate, ethyl carbonate, diethyl carbonate, cyclocarbonate, and diphenyl carbonate.

Examples of the polyol capable of reacting with the carbonic ester include relatively low-molecular-weight dihydroxy compounds such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 1,6-hexanediol, 1,7-heptanediol, 1,8-octanediol, 1,9-nonanediol, 1,10-decanediol, 3-methyl-1,5-pentanediol, 2-ethyl-1,3-hexanediol, 2-methyl-1,3-propanediol, 2-methyl-1,8-octanediol, 2-butyl-2-ethylpropanediol, 2-methyl-1,8-octanediol, neopentyl glycol, 1,4-cyclohexanediol, 1,4-cyclohexanedimethanol, hydroquinone, resorcine, bisphenol-A, bisphenol-F, and 4,4'-biphenol.

The above-described polyether polyol, polyester polyol, polycarbonate polyol, and, as needed, other polyols may be used in combination with one another as polyols.

Examples of the other polyols include ethylene glycol, 1,2-propanediol, 1,3-butanediol, 1,4-butanediol, 3-methyl-1,5-pentanediol, 1,6-hexanediol, 1,4-cyclohexanedimethanol, neopentyl glycol, diethylene glycol, dipropylene glycol, and acrylic polyols produced by introducing hydroxyl groups to an acrylic copolymer.

An urethane resin can be produced by reacting the above-described polyisocyanate with the above-described polyol by, for example, a method in which the polyisocyanate is reacted with the polyol to produce a urethane resin including an isocyanate group and subsequently, as needed, a chain extension agent is mixed and reacted with the urethane resin.

The reaction of the polyisocyanate with the polyol may be conducted in the presence of an organic solvent such as methyl ethyl ketone or dimethylformamide or without a solvent.

The reaction of the polyisocyanate with the polyol can be conducted by charging the polyisocyanate and the polyol by mixing them with each other at the same time or by adding one of the polyisocyanate and the polyol dropwise to the other at a reaction temperature of preferably 50° C. to 120° C. and more preferably 80° C. to 100° C. with great attention given to sudden heat generation and sudden foaming and consideration to safety and thereby causing a reaction for about 1 to 15 hours.

The urethane resin preferably has a weight-average molecular weight of 50,000 to 120,000.

The urethane bonding agent may contain a curing agent in addition to the urethane resin.

Examples of the curing agent include an isocyanate curing agent, an epoxy curing agent, a melamine curing agent, a carbodiimide curing agent, an oxazoline curing agent, and an aziridine curing agent.

The foam base and the resin film can be bonded to each other using a bonding agent such as the urethane bonding agent by a dry lamination method, a non-solvent lamination method, a wet lamination method, or the like. In particular, a dry lamination method is preferably employed since it enables a lamination step to be conducted in an efficient manner and the amount of solvent that may remain in the bonding-agent layer to be reduced.

A preferable example of the bonding method is a method (i.e., dry lamination method) in which, specifically, the bonding agent is applied to the resin film by direct gravure or the like, the solvent contained in the bonding agent is removed by drying using a drier or the like, and the foam base is laminated with the resulting bonding-agent layer.

The drying temperature is preferably 30° C. to 100° C. and is further preferably 35° C. to 70° C. The temperature at which the foam base is laminated with the bonding-agent layer is preferably 20° C. to 80° C. and is more preferably 30° C. to 50° C. in order to achieve strong adhesion between the resin film and the foam base and reduce the likelihood of the resin film being wrinkled.

The amount of bonding agent applied is preferably 0.5 to 10 g/m$^2$, is more preferably 2 to 6 g/m$^2$, and is further preferably 3 to 5 g/m$^2$, which is slightly larger than the amount of bonding agent applied in an ordinary dry lamination method, in order to achieve strong adhesion between the resin film and the foam base.

[Adhesive Layer]

The adhesive layer included in the double-sided adhesive tape according to the present invention is disposed on a core of the double-sided adhesive tape, which is a laminated body including the foam base and the resin film disposed on one or both surfaces of the foam base. That is, the adhesive layer is disposed on the surfaces of the resin films or on the surface of the resin film and a surface of the foam base on which the resin film is not disposed. At least one of the adhesive layers, at least one of the adhesive layers and preferably both adhesive layers have a 180°-peel adhesion of 10 N/20 mm or more and preferably have a 180°-peel adhesion of 12 N/20 mm or more. The 180°-peel adhesion of the adhesive layer is measured at a peeling speed of 300 mm/min when an adhesive tape including a 25-µm-thick polyethylene terephthalate base and a 25-µm-thick adhesive layer disposed on the polyethylene terephthalate base is bonded to an aluminium board under conditions of a temperature of 23° C. and a relative humidity of 65% RH by pressing the adhesive tape against the aluminium board with one stroke of a 2-kg roller, the adhesive tape is left standing for 1 hour under conditions of a temperature 23° C. and a relative humidity of 50% RH, and subsequently the adhesive tape is left standing for 1 hour under conditions of a temperature 23° C. and a relative humidity of 50% RH. A double-sided adhesive tape including an adhesive layer having a 180°-peel adhesion that falls within the above range has suitable impact resistance and is capable of being dismantled when a certain amount of force is applied to the double-sided adhesive tape since interlaminar cracking occurs in foam base when the double-sided adhesive tape is dismantled. The upper limit of the 180°-peel adhesion of the adhesive layer is preferably, but not particularly limited to, 25 N/20 mm or less and is further preferably 20 N/20 mm or less.

Examples of an adhesive that can be used for forming the adhesive layer include an acrylic adhesive, a urethane adhesive, a synthetic-rubber adhesive, a natural-rubber adhesive, and a silicone adhesive. In particular, among these adhesives, an acrylic adhesive containing an acrylic polymer as a base polymer and, as needed, additives such as a tackifier and a crosslinking agent is preferably used in order to form an adhesive layer having the desired 180°-peel adhesion and the like.

Examples of a (meth)acrylate that can be used for producing the acrylic polymer include (meth)acrylates including an alkyl group having 1 to 12 carbon atoms, such as methyl(meth)acrylate, ethyl(meth)acrylate, n-butyl(meth)acrylate, isobutyl(meth)acrylate, t-butyl(meth)acrylate, n-hexyl(meth)acrylate, n-octyl(meth)acrylate, isooctyl(meth)acrylate, isononyl(meth)acrylate, cyclohexyl(meth)acrylate, and 2-ethylhexyl(meth)acrylate. These (meth)acrylates may be used alone or in combination of two or more. In particular, (meth)acrylates including an alkyl group having 4 to 12 carbon atoms are preferably used, (meth)acrylates including a linear or branched alkyl group having 4 to 8 carbon atoms are more preferably used, and one or more selected from the group consisting of n-butyl acrylate and 2-ethylhexyl acrylate are preferably used in order to form an adhesive layer having the desired 180°-peel adhesion and the like.

The amount of the (meth)acrylate including an alkyl group having 1 to 12 carbon atoms is preferably 60% by mass or more, is more preferably 80% by mass to 98.5% by mass, and is further preferably 90% by mass to 98.5% by mass of the total amount of monomer components used for producing the acrylic polymer.

The acrylic polymer can be produced using a highly polar vinyl monomer as a monomer component. Examples of the highly polar vinyl monomer include vinyl monomers including a hydroxyl group, vinyl monomers including a carboxyl group, and vinyl monomers including an amide group. These vinyl monomers may be used alone or in combination of two or more.

Examples of the vinyl monomers including a hydroxyl group include (meth)acrylates including a hydroxyl group, such as 2-hydroxyethyl(meth)acrylate, 2-hydroxypropyl(meth)acrylate, 4-hydroxybutyl(meth)acrylate, and 6-hydroxyhexyl(meth)acrylate.

Examples of the vinyl monomers including a carboxyl group include acrylic acid, methacrylic acid, itaconic acid, maleic acid, a (meth)acrylic acid dimer, crotonic acid, and ethylene-oxide modified succinic acid acrylate. In particular, acrylic acid is preferably used.

Examples of the vinyl monomers including an amide group include N-vinylpyrrolidone, N-vinylcaprolactam, acryloylmorpholine, acrylamide, and N,N-dimethylacrylamide.

Examples of other highly polar vinyl monomers include vinyl acetate, ethylene-oxide modified succinic acid acrylate, and vinyl monomers including a sulfonic group, such as 2-acrylamide-2-methylpropanesulfonic acid.

The amount of the highly polar vinyl monomer is preferably 1.5% by mass to 20% by mass, is more preferably 1.5% by mass to 10% by mass, and is preferably 2% by mass to 8% by mass of the total amount of monomer components used for producing the acrylic polymer in order to form an adhesive layer having the desired 180°-peel adhesion and the like.

In the case where an isocyanate crosslinking agent is added to the adhesive together with the acrylic polymer, the acrylic polymer preferably includes a functional group capable of reacting with the isocyanate group.

In such a case, a vinyl monomer having a hydroxyl group is preferably used and 2-hydroxyethyl(meth)acrylate, 4-hydroxybutyl(meth)acrylate, and 6-hydroxyhexyl(meth)acrylate are more preferably used as a monomer component.

The amount of the vinyl monomer including a hydroxyl group is preferably 0.01% by mass to 1.0% by mass and is more preferably 0.03% by mass to 0.3% by mass of the total amount of monomer components used for producing the acrylic polymer.

The acrylic polymer can be produced by polymerization of the above-described monomer components. Examples of the polymerization method include publicly known polymerization methods such as a solution polymerization method, a bulk polymerization method, a suspension polymerization method, and an emulsion polymerization method. A solution polymerization method and a bulk polymerization method are preferably employed in order to produce an adhesive having high water resistance.

The polymerization can be initiated and performed by a method in which a peroxide-based thermopolymerization initiator such as benzoyl peroxide or lauroyl peroxide or an azo-based thermopolymerization initiator such as azobisisobutyronitrile is used; a method in which an acetophenone-based photopolymerization initiator, a benzoin ether-based photopolymerization initiator, a benzyl ketar-based photopolymerization initiator, an acylphosphine oxide-based photopolymerization initiator, a benzoin-based photopolymerization initiator, or a benzophenone-based photopolymerization initiator is used; or a method in which irradiation with an electron beam is performed.

The weight-average molecular weight of the acrylic polymer is preferably 400 thousand to 3 million and is more preferably 800 thousand to 2.5 million as measured by gel permeation chromatography (GPC) in terms of standard polystyrene.

The measurement of molecular weight by GPC is conducted using a GPC system (HLC-8329GPC) produced by Tosoh Corporation in terms of standard polystyrene under the following conditions.

Sample concentration: 0.5% by mass (tetrahydrofuran solution)
Sample injection volume: 100 μl
Eluent: THF
Flow rate: 1.0 ml/minute
Temperature: 40° C.
Main column: TSKgel GMHHR-H(20), two columns
Guard column: TSKgel HXL-H
Detector: Differential refractometer
Molecular weight of standard polystyrene: 10 thousand to 20 million (produced by Tosoh Corporation)

The adhesive preferably contains a tackifier in order to further increase adhesion to adherends and face-adhesive strength. Examples of the tackifier include rosin-based tackifiers, polymerized-rosin-based tackifiers, polymerized-rosin-ester-based tackifiers, rosin-phenol-based tackifiers, stabilized-rosin-ester-based tackifiers, disproportionated-rosin-ester-based tackifiers, hydrogenated-rosin-ester-based tackifiers, terpene-based tackifiers, terpene-phenol-based tackifiers, petroleum-resin-based tackifiers, and (meth) acrylate-resin-based tackifiers.

Among these tackifiers, disproportionated-rosin-ester-based tackifiers, polymerized-rosin-ester-based tackifiers, rosin-phenol-based tackifiers, hydrogenated-rosin-ester-based tackifiers, (meth)acrylate-resin-based tackifiers, and terpene-phenol-based tackifiers are preferably used alone or in combination of two or more. The above-described tackifiers are preferably used in combination with a petroleum-derived resin. In the case where the adhesive is an emulsion-type adhesive, the tackifier is preferably an emulsion-type tackifier.

The softening point of the tackifier is preferably 30° C. to 180° C. and is preferably 70° C. to 140° C. in order to form an adhesive layer having the desired 180°-peel adhesion and the like. In the case where the (meth)acrylate-based tackifier is used, the glass transition temperature of the (meth)acrylate-based tackifier is preferably 30° C. to 200° C. and is more preferably 50° C. to 160° C.

The amount of the tackifier is preferably 5 to 65 parts by mass and is preferably 8 to 55 parts by mass relative to 100 parts by mass of the acrylic polymer in order to form an adhesive layer having the desired 180°-peel adhesion and the like and high adhesion.

The adhesive preferably contains, in addition to the above-described acrylic polymer and tackifier, as needed, a crosslinking agent in order to form an adhesive layer having high cohesion.

Examples of the crosslinking agent include isocyanate crosslinking agents, epoxy crosslinking agents, metal-chelate crosslinking agents, and aziridine crosslinking agents.

Among these crosslinking agents, isocyanate crosslinking agents and epoxy crosslinking agents, which have a high reactivity with an acrylic polymer, are preferably used alone or in combination, and isocyanate crosslinking agents are preferably used in order to further increase the adhesion between the adhesive layer and the foam base.

Examples of the isocyanate crosslinking agents include tolylene diisocyanate, naphthylene-1,5-diisocyanate, hexamethylene diisocyanate, diphenylmethane diisocyanate, xylylene diisocyanate, and trimethylolpropane-modified tolylene diisocyanate. Tolylene diisocyanate and trimethylolpropane adducts thereof are preferably used.

The gel fraction in the adhesive layer, which is the insoluble content in the adhesive layer which is measured after the adhesive layer is immersed in toluene for 24 hours, is used as an index for determining the degree of crosslinking. The gel fraction in the adhesive layer is preferably 70% by mass or less. The gel fraction in the adhesive layer is more preferably 20% by mass to 60% by mass and is further preferably 25% by mass to 55% by mass in order to increase cohesion and adhesion.

The gel fraction in the adhesive layer can be measured in the following manner. The adhesive is applied to a release sheet such that the resulting coating film has a thickness of 50 µm when being dried. The coating film is dried at 100° C. for 3 minutes and subsequently aged at 40° C. for 2 days. The resulting adhesive tape is cut to a square piece of 50 mm per side and used as a sample. The mass (G1) of the sample is measured before the sample is immersed in toluene. Then, the sample is immersed in a toluene solution at 23° C. for 24 hours. A component of the sample which is insoluble in toluene is filtered off using a 300-mesh metal screen, and subsequently drying is performed at 110° C. for 1 hour. Then, the mass (G2) of the residue is measured. The gel fraction in the adhesive layer is calculated using the following formula.

Gel fraction(mass %)=(G2/G1)×100

The adhesive may optionally contain, in addition to the above-described components, as needed, additives such as a plasticizer, a softener, an antioxidant, a flame retardant, a filler such as fibers made of glass or plastic, balloons, beads, a metal powder, a metal oxide, or a metal nitride, a colorant such as a pigment or a dye, a leveling agent, a thickener, a water repellent, and an antifoaming agent.

The adhesive layer, which is formed using the above-described adhesive, preferably has a loss tangent (tanδ) at a frequency of 1 Hz which peaks at −40° C. to 15° C. in order to achieve the desired 180°-peel adhesion and high adhesion to adherends at normal temperature. The temperature at which the loss tangent (tanδ) of the adhesive layer peaks is preferably −35° C. to 10° C. and is more preferably −30° C. to 6° C. in order to achieve the desired 180°-peel adhesion and high adhesion to adherends at normal temperature and further enhance impact resistance at a low temperature.

The loss tangent (tanδ) of the adhesive layer at a frequency of 1 Hz can be determined from storage modulus (G') and loss modulus (G") measured by a dynamic viscoelasticity measurement using temperature variance using the following formula: tanδ=G"/G'. The measurement of dynamic viscoelasticity is conducted using a viscoelasticity tester (product name: ARES G2 produced by TA Instruments Japan Inc.). Specifically, a test specimen, which is an adhesive layer having a thickness of about 2 mm, is interposed between portions of the test section of the tester, which are parallel discs having a diameter of 8 mm, and the storage modulus (G') and loss modulus (G") of the test specimen are measured at a frequency of 1 Hz while the temperature is changed from −50° C. to 150° C.

The thickness of the adhesive layer is preferably 5 to 100 µm, is more preferably 10 to 80 µm, and is further preferably 15 to 80 µm in order to achieve the desired 180°-peel adhesion and, as a result, further increase adhesion to adherends.

[Double-Sided Adhesive Tape]

The double-sided adhesive tape according to the present invention can be produced by laminating the specific foam base with the specific adhesive layer and the resin film. The double-sided adhesive tape has suitable impact resistance even when the thickness of the double-sided adhesive tape is small. Furthermore, when a certain amount of force is applied to the double-sided adhesive tape, interlaminar cracking occurs in the foam base, which enables the double-sided adhesive tape to be dismantled into pieces in a suitable manner. In addition, residual objects such as paste which may remain on the surfaces of the adherends after the double-sided adhesive tape is dismantled can be readily separated and removed. Therefore, the double-sided adhesive tape according to the present invention can be suitably used for, for example, fixing parts of compact electronic equipment in place and, in particular, fixing tabular rigid parts of compact electronic equipment to which a large amount of force is likely to be applied when the parts are separated from one another, such as protection panels for information displays, image-display modules, and thin batteries, in place.

A double-sided adhesive tape according to an embodiment of the present invention includes, as fundamental components, for example, a core that is a laminated body including a foam base and a resin film, an adhesive layer disposed on a surface of the foam base, and another adhesive layer disposed on a surface of the resin film. The adhesive layer may be disposed on the foam base directly or with another layer interposed therebetween. The adhesive layer may be disposed on the resin film directly or with another layer interposed therebetween. The structure of the double-sided adhesive tape may be selected appropriately depending on the application of the double-sided adhesive tape. The double-sided adhesive tape may further include a lamination layer such as a polyester film in order to obtain dimensional stability and the like. The double-sided adhesive tape may further include a light-blocking layer in order to obtain a light-blocking effect. The double-sided adhesive tape may further include a light-reflection layer in order to obtain light reflectivity. The double-sided adhesive tape may further include a metal foil, a metal mesh, or nonwoven fabric on which an electrically conductive metal is deposited in order to obtain an electromagnetic-wave shielding property and thermal conductivity in the planar direction.

Examples of the lamination layer include films composed of various resins, such as polyester films composed of polyethylene terephthalate or the like, polyethylene films, and polypropylene films. The thickness of the lamination layer is preferably, but not particularly limited to, 1 to 25 µm and is more preferably 2 to 12 µm from the viewpoint of the conformability of the foam base. A transparent film, a film having a light-blocking effect, and a film having light reflectivity may be used as a lamination layer depending on the application. In the case where the foam layer is laminated with the lamination layer, publicly known adhesives and bonding agents for dry lamination can be used.

The light-blocking layer can be simply prepared using an ink containing a colorant such as a pigment and is preferably a layer including a black ink in order to achieve a good light-blocking property. The light-reflection layer can be simply prepared using a white ink. Thicknesses of these layers are preferably 2 to 20 µm and is more preferably 4 to 6 µm. Limiting the thicknesses of these layers to be within the above range reduces the occurrence of curling of the base due to hardening and shrinking of the ink, which enhances the formability of the tape.

The double-sided adhesive tape according to the present invention can be produced by, for example, a direct method in which the adhesive is applied to a core that is a laminated body including the foam base and the resin film deposited thereon, that is, specifically, onto the foam-base-side surface and the resin-film-side surface of the core, and subsequently drying and the like are performed in order to form adhesive layers; or a method in which the adhesive is applied onto the surfaces of release sheets and subsequently drying and the like are performed in order to form adhesive layers and the adhesive layers are transferred onto the foam-base-side surface and the resin-film-side surface of the core.

In the case where the adhesive contains a crosslinking agent, the double-sided adhesive tape is preferably aged at 20° C. to 50° C. and is more preferably aged at 23° C. to 45° C. for 2 to 7 days in order to allow a crosslinking reaction to proceed. This enables an adhesive layer having the desired 180°-peel adhesion to be formed and further increases the adhesion between the foam base and the adhesive layer.

The release sheet may be, but is not particularly limited to, a release sheet produced by subjecting at least one of the surfaces of a base that is a synthetic resin film such as a polyethylene film, a polypropylene film, or a polyester film, paper, nonwoven fabric, cloth, a foamed sheet, a metal foil, or a laminated body including these bases to a releasability-improving treatment such as a silicone treatment, a long-chain alkyl treatment, or a fluorine treatment in order to increase releasability from the adhesive.

Among these release sheets, for example, wood free paper with both surfaces thereof being laminated with a polyethylene film having a thickness of 10 to 40 μm and a release sheet produced by subjecting one or both surfaces of a base composed of a polyester film to a silicone releasability-improving treatment are preferably used.

The thickness of the double-sided adhesive tape according to the present invention may be controlled appropriately depending on the application. The thickness of the double-sided adhesive tape is preferably 300 μm or less, is more preferably 80 to 300 μm, and is further preferably 100 to 300 μm in order to contribute to a reduction in the thickness of compact electronic equipment. The double-sided adhesive tape according to the present invention has suitable impact resistance and ease of dismantling even when the thickness of the double-sided adhesive tape is small.

The above-described double-sided adhesive tape according to the present invention, which has suitable impact resistance and ease of dismantling, can be suitably used for fixing parts of compact electronic equipment in place, such as protection panels for information displays, image display modules, thin batteries, speakers, receivers, piezoelectric devices, printed substrates, flexible printed substrates (FPC), digital camera modules, censors, and other modules of compact electronic equipment, cushion rubber members composed of polyurethane, a polyolefin, or the like, decorating parts, and various types of members. The above-described double-sided adhesive tape according to the present invention is particularly suitably used for fixing thin, tabular rigid parts of compact electronic equipment in place, such as protection panels for information displays, image display modules, and thin batteries.

EXAMPLES (Preparation of Adhesive Composition (A))

Inside a reactor equipped with a stirrer, a reflux condenser, a thermometer, a dropping funnel, and a nitrogen gas introduction port, 97.97 parts by mass of n-butyl acrylate, 2.0 parts by mass of acrylic acid, 0.03 parts by mass of 4-hydroxybutyl acrylate, and 0.1 parts by mass of 2,2'-azobisisobutyronitrile that served as a polymerization initiator were dissolved in 100 parts by mass of ethyl acetate that served as a solvent. Subsequently, polymerization was performed at 70° C. for 12 hours to prepare an acrylic copolymer having a weight-average molecular weight of 2 million (in terms of polystyrene). To 100 parts by mass of the acrylic copolymer, 25 parts by mass of a "SUPER ESTER A100" (glycerin ester of disproportionated rosin) produced by Arakawa Chemical Industries, Ltd., 5 parts by mass of a "PENSEL D135" (pentaerythritol ester of polymerized rosin) produced by Arakawa Chemical Industries, Ltd., and 20 parts by mass of a FTR6100 (styrene-type petroleum resin) produced by Mitsui Chemicals, Inc. were added. Ethyl acetate was further added to the acrylic polymer, and the above components were mixed together uniformly. Thus, an adhesive composition (a) having a nonvolatile content of 40% by mass was prepared.

Subsequently, 100 parts by mass of the adhesive composition (a) was mixed with 1.3 parts by mass of a "CORONATE L-45" (isocyanate crosslinking agent, nonvolatile content: 45 mass %) produced by Nippon Polyurethane Industry Co., Ltd., and the resulting mixture was stirred for 15 minutes. Thus, an adhesive (A) was prepared. The adhesive (A) had a 180°-peel adhesion of 12 N/20 mm. The 180°-peel adhesion of the adhesive (A) was measured by the following method.

[180°-Peel Adhesion of Adhesive Layer]

The adhesive (A) was applied onto a surface of a 75-μm-thick polyethylene terephthalate film that had been subjected to a releasability-improving treatment such that the resulting adhesive layer had a thickness of 25 μm when being dried. The resulting adhesive layer was dried at 80° C. for 3 minutes and subsequently bonded to a 25-μm-thick polyethylene terephthalate base. The resulting laminated body was aged at 40° C. for 48 hours. Thus, an adhesive tape was prepared.

The adhesive tape was bonded to an aluminium board under conditions of a temperature of 23° C. and a relative humidity of 65% RH by pressing the adhesive tape against the aluminium board with one stroke of a 2-kg roller. The aluminium board on which the adhesive tape was adhered was left standing for 1 hour under conditions of a temperature of 23° C. and a relative humidity of 50% RH. Then, the strength of the adhesive tape which was observed when the adhesive tape was separated at an angle of 180° from the aluminium board at a peeling speed of 300 mm/min was measured. The 180°-peel adhesions of the adhesive layers prepared using the adhesives (B) to (D) described below were also measured by the above-described method.

(Preparation of Adhesive Composition (B))

Inside a reactor equipped with a stirrer, a reflux condenser, a thermometer, a dropping funnel, and a nitrogen gas introduction port, 93.4 parts by mass of n-butyl acrylate, 3.5 parts by mass of acrylic acid, 3 parts by mass of vinyl acetate, 0.1 parts by mass of 2-hydroxyethyl acrylate, and 0.1 parts by mass of 2,2'-azobisisobutyronitrile that served as a polymerization initiator were dissolved in 100 parts by mass of ethyl acetate that served as a solvent. Subsequently, polymerization was performed at 70° C. for 12 hours to prepare an acrylic copolymer having a weight-average molecular weight of 1.6 million (in terms of polystyrene). To 100 parts by mass of the acrylic copolymer, 30 parts by mass of a "SUPER ESTER A100" (glycerin ester of disproportionated rosin) produced by Arakawa Chemical Industries, Ltd., 25 parts by mass of a FTR6100 (styrene-type petroleum resin) produced by Mitsui Chemicals, Inc., and 5 parts by mass of a "PENSEL D135" (pentaerythritol ester of polymerized rosin) produced by Arakawa Chemical Industries, Ltd., were added. Ethyl acetate was further added to the acrylic polymer, and the above components were mixed together uniformly. Thus, an adhesive composition (b) having a nonvolatile content of 38% by mass was prepared.

Subsequently, 100 parts by mass of the adhesive composition (b) was mixed with 1.3 parts by mass of a "CORONATE L-45" (isocyanate crosslinking agent, nonvolatile content: 45 mass %) produced by Nippon Polyurethane Industry Co., Ltd., and the resulting mixture was stirred for 15 minutes. Thus, an adhesive (B) was prepared. The adhesive (B) had a 180°-peel adhesion of 13.7 N/20 mm.
(Preparation of Adhesive Composition (C))

Inside a reactor equipped with a stirrer, a reflux condenser, a thermometer, a dropping funnel, and a nitrogen gas introduction port, 44.94 parts by mass of n-butyl acrylate, 50 parts by mass of 2-ethylhexyl acrylate, 3 parts by mass of vinyl acetate, 2 parts by mass of acrylic acid, 0.06 parts by mass of 4-hydroxybutyl acrylate, and 0.1 parts by mass of 2,2'-azobisisobutyronitrile that served as a polymerization initiator were dissolved in 100 parts by mass of ethyl acetate that served as a solvent. Subsequently, polymerization was performed at 70° C. for 12 hours to prepare an acrylic copolymer having a weight-average molecular weight of 1.2 million (in terms of polystyrene). To 100 parts by mass of the acrylic copolymer, 10 parts by mass of a "PENSEL D135" (pentaerythritol ester of polymerized rosin) produced by Arakawa Chemical Industries, Ltd. was added. Ethyl acetate was further added to the acrylic polymer, and the above components were mixed together uniformly. Thus, an adhesive composition (c) having a nonvolatile content of 45% by mass was prepared.

Subsequently, 100 parts by mass of the adhesive composition (c) was mixed with 1.3 parts by mass of a "CORONATE L-45" (isocyanate crosslinking agent, nonvolatile content: 45 mass %) produced by Nippon Polyurethane Industry Co., Ltd., and the resulting mixture was stirred for 15 minutes. Thus, an adhesive (C) was prepared. The adhesive (C) had a 180°-peel adhesion of 8.9 N/20 mm.
(Preparation of Adhesive Composition (D))

Inside a reactor equipped with a stirrer, a reflux condenser, a thermometer, a dropping funnel, and a nitrogen gas introduction port, 93.4 parts by mass of n-butyl acrylate, 3.5 parts by mass of acrylic acid, 3 parts by mass of vinyl acetate, 0.1 parts by mass of 2-hydroxyethyl acrylate, and 0.1 parts by mass of 2,2'-azobisisobutyronitrile that served as a polymerization initiator were dissolved in 100 parts by mass of ethyl acetate that served as a solvent. Subsequently, polymerization was performed at 70° C. for 12 hours to prepare an acrylic copolymer having a weight-average molecular weight of 1.6 million (in terms of polystyrene). To 100 parts by mass of the acrylic copolymer, 9.4 parts by mass of a "SUPER ESTER A100" (glycerin ester of disproportionated rosin) produced by Arakawa Chemical Industries, Ltd. and 9.4 parts by mass of a "HARITACK PCJ" (pentaerythritol ester of polymerized rosin) produced by Harima Chemicals Group, Inc. were added. Ethyl acetate was further added to the acrylic polymer, and the above components were mixed together uniformly. Thus, an adhesive composition (d) having a nonvolatile content of 38% by mass was prepared.

Subsequently, 100 parts by mass of the adhesive composition (d) was mixed with 1.3 parts by mass of a "CORONATE L-45" (isocyanate crosslinking agent, nonvolatile content: 45 mass %) produced by Nippon Polyurethane Industry Co., Ltd., and the resulting mixture was stirred for 15 minutes. Thus, an adhesive (D) was prepared. The adhesive (D) had a 180°-peel adhesion of 8.5 N/20 mm.

Example 1

The adhesive (A) prepared above was applied onto a surface of a 75-μm-thick polyethylene terephthalate film that had been subjected to a releasability-improving treatment such that the resulting adhesive layer had a thickness of 25 μm when being dried. The resulting adhesive layer was dried at 80° C. for 3 minutes. Thus, a polyethylene terephthalate film including a 25-μm-thick adhesive layer deposited thereon was prepared.

The adhesive (A) was also applied onto a surface of a 75-μm-thick polyethylene terephthalate film that had been subjected to a releasability-improving treatment such that the resulting adhesive layer had a thickness of 15 μm when being dried. The resulting adhesive layer was dried at 80° C. for 3 minutes. Thus, a polyethylene terephthalate film including a 15-μm-thick adhesive layer deposited thereon was prepared.

A base composed of a black polyolefin foam (1) (thickness: 100 μm, density: 0.40 g/cm³, interlaminar strength: 12.6 N/cm, 25%-compressive strength: 103 kPa, tensile strength in machine direction: 1084 N/cm², tensile strength in width direction: 790 N/cm², produced by SEKISUI CHEMICAL CO., LTD., surface wetting index was increased to 54 mN/m by performing a corona treatment) was laminated with a resin film composed of polyethylene terephthalate (thickness: 6 μm) using the urethane bonding agent described below to prepare a laminated body.

The urethane bonding agent used was a urethane bonding agent (α) that was a dimethylformamide solution (nonvolatile content: 30 mass %) of a urethane resin having a weight-average molecular weight of 100,000. The urethane resin was prepared by reacting a polyester polyol having a number-average molecular weight of 2,000 with polyoxytetramethylene glycol, ethylene glycol, and 4,4'-diphenylmethane diisocyanate. The polyester polyol was prepared by reacting 1,4-butanediol with neopentyl glycol and adipic acid.

The polyethylene terephthalate film including the 25-μm-thick adhesive layer was bonded to the resin-film-side surface of the laminated body. The polyethylene terephthalate film including the 15-μm-thick adhesive layer was bonded to the foam-side surface of the laminated body. Subsequently, lamination was performed at 23° C. using a roller at a linear pressure of 5 kg/cm. The resulting laminated body was aged at 40° C. for 48 hours. Thus, a double-sided adhesive tape having a thickness of 150 μm was prepared. The gel fraction in the adhesive (A) layer constituting the double-sided adhesive tape was 42.5% by mass. The gel fraction in the adhesive layer was determined on the basis of the change in the mass of the double-sided adhesive tape which occurred while the double-sided adhesive tape was immersed in toluene kept at room temperature for 24 hours. The gel fractions in the adhesive layers prepared using the adhesives (B) to (D) below were also determined by the above-described method.

Example 2

A double-sided adhesive tape having a thickness of 140 μm was prepared as in Example 1, except that the thickness of the adhesive layer disposed on the resin-film-side surface of the laminated body, which was measured when the adhesive layer was dried, was changed to 15 μm.

Example 3

A double-sided adhesive tape having a thickness of 200 μm was prepared as in Example 1, except that the thicknesses of the adhesive layers disposed on the resin-film-side surface and the foam-side surface of the laminated body, which were measured when the adhesive layers were dried, were changed to 45 μm.

Example 4

A double-sided adhesive tape having a thickness of 120 µm was prepared as in Example 1, except that a black polyolefin foam (2) (thickness: 80 µm, density: 0.40 g/cm$^3$, interlaminar strength: 10.2 N/cm, 25%-compressive strength: 92 kPa, tensile strength in machine direction: 1062 N/cm$^2$, tensile strength in width direction: 962 N/cm$^2$, produced by SEKISUI CHEMICAL CO., LTD., surface wetting index was increased to 54 mN/m by performing a corona treatment) was used instead of the black polyolefin foam (1) and the thickness of the adhesive layer disposed on the resin-film-side surface of the laminated body, which was measured when the adhesive layer was dried, was changed to 15 µm.

Example 5

A double-sided adhesive tape having a thickness of 150 µm was prepared as in Example 1, except that a black polyolefin foam (3) (thickness: 100 µm, density: 0.45 g/cm$^3$, interlaminar strength: 16.2 N/cm, 25%-compressive strength: 190 kPa, tensile strength in machine direction: 964 N/cm$^2$, tensile strength in width direction: 861 N/cm$^2$, produced by SEKISUI CHEMICAL CO., LTD., surface wetting index was increased to 54 mN/m by performing a corona treatment) was used instead of the black polyolefin foam (1).

Example 6

A double-sided adhesive tape having a thickness of 200 µm was prepared as in Example 5, except that the thicknesses of the adhesive layers disposed on the resin-film-side surface and the foam-side surface of the laminated body, which were measured when the adhesive layers were dried, were changed to 45 µm.

Example 7

A double-sided adhesive tape having a thickness of 200 µm was prepared as in Example 1, except that a black polyolefin foam (4) (thickness: 140 µm, density: 0.40 g/cm$^3$, interlaminar strength: 19.1 N/cm, 25%-compressive strength: 130 kPa, tensile strength in machine direction: 994 N/cm$^2$, tensile strength in width direction: 713 N/cm$^2$, produced by SEKISUI CHEMICAL CO., LTD., surface wetting index was increased to 54 mN/m by performing a corona treatment) was used instead of the black polyolefin foam (1) and the thicknesses of the adhesive layers disposed on the resin-film-side surface and the foam-side surface of the laminated body, which were measured when the adhesive layers were dried, were changed to 25 µm.

Example 8

A double-sided adhesive tape was prepared as in Example 1, except that a resin film composed of polyethylene terephthalate (thickness: 3 µm) was used instead of the resin film composed of polyethylene terephthalate (thickness: 6 µm) and the thickness of the adhesive layer disposed on the resin-film-side surface of the laminated body, which was measured when the adhesive layer was dried, was changed to 28 µm.

Example 9

A double-sided adhesive tape was prepared as in Example 1, except that a resin film composed of polyethylene terephthalate (thickness: 16 µm) was used instead of the resin film composed of polyethylene terephthalate (thickness: 6 µm).

Example 10

A double-sided adhesive tape having a thickness of 150 µm was prepared as in Example 1, except that the adhesive composition (B) was used instead of the adhesive composition (A). The gel fraction in the adhesive (B) layer constituting the double-sided adhesive tape was 40% by mass.

Comparative Example 1

A double-sided adhesive tape having a thickness of 150 µm was prepared as in Example 1, except that a black polyolefin foam (5) (thickness: 100 µm, density: 0.33 g/cm$^3$, interlaminar strength: 8.9 N/cm, 25%-compressive strength: 70 kPa, tensile strength in machine direction: 799 N/cm$^2$, tensile strength in width direction: 627 N/cm$^2$, produced by SEKISUI CHEMICAL CO., LTD., surface wetting index was increased to 54 mN/m by performing a corona treatment) was used instead of the black polyolefin foam (1).

Comparative Example 2

A double-sided adhesive tape having a thickness of 150 µm was prepared as in Example 1, except that a black polyolefin foam (6) (thickness: 100 µm, density: 0.50 g/cm$^3$, interlaminar strength: 13.6 N/cm, 25%-compressive strength: 270 kPa, tensile strength in machine direction: 1456 N/cm$^2$, tensile strength in width direction: 956 N/cm$^2$, produced by SEKISUI CHEMICAL CO., LTD., surface wetting index was increased to 54 mN/m by performing a corona treatment) was used instead of the black polyolefin foam (1).

Comparative Example 3

A double-sided adhesive tape having a thickness of 150 µm was prepared as in Example 1, except that the adhesive composition (C) was used instead of the adhesive composition (A). The gel fraction in the adhesive (C) layer constituting the double-sided adhesive tape was 38% by mass.

Comparative Example 4

A double-sided adhesive tape having a thickness of 200 µm was prepared as in Example 1, except that the adhesive composition (D) was used instead of the adhesive composition (A). The gel fraction in the adhesive (D) layer constituting the double-sided adhesive tape was 48% by mass.

Comparative Example 5

A double-sided adhesive tape having a thickness of 150 µm was prepared as in Example 1, except that the formation of the resin film was omitted and the thicknesses of the adhesive layers disposed on both surfaces of the laminated body, which were measured when the adhesive layers were dried, were changed to 25 µm.

The foam bases used in Examples and Comparative Examples above and the double-sided adhesive tapes prepared in Examples and Comparative Examples above were evaluated for the following items. Tables 1 to 3 summarize the results.

[Thicknesses of Foam Base and Double-Sided Adhesive Tape]

The thickness of the foam base was measured using a Dial Thickness Gauge Model-G produced by OZAKI MFG. CO., LTD. The thickness of the adhesive tape was measured using a Dial Thickness Gauge Model-G after release films were removed from the adhesive tape.

[Density of Foam Base]

The density of the foam base was measured in accordance with JIS K6767. Specifically, foam bases that had been cut to a 4 cm×5 cm rectangular shape were prepared such that the total volume of the foam bases was 15 cm$^3$, the total mass of the foam bases was measured, and the density of the foam bases was calculated.

[Interlaminar Strength of Foam Base]

A 50-μm-thick adhesive layer having high adhesion (such that the adhesive layer was not separated from adherends and the foam base even under the high-speed peeling test described below) was bonded onto each surface of the foam base. The resulting laminated body was aged at 40° C. for 48 hours. Thus, a double-sided adhesive tape used for measuring interlaminar strength was prepared.

One of the adhesive surfaces of the double-sided adhesive tape was lined with a polyester film having a thickness of 25 μm, and the resulting double-sided adhesive tape was cut into a piece having a size of 1 cm by 15 cm in the width and machine directions of the foam base, respectively. The piece of the double-sided adhesive tape was bonded to a polyester film having a thickness of 50 μm, a width of 3 cm, and a length of 20 cm under condition of a temperature of 23° C. and a relative humidity of 50% RH and pressed against the polyester film with one stroke of a 2-kg roller to perform press bonding. The resulting laminated body was left standing at 60° C. for 48 hours. Subsequently, the laminated body was left standing at 23° C. for 24 hours. Thus, a test specimen was prepared.

Under condition of a temperature of 23° C. and a relative humidity of 50% RH, the 50-μmm-thick-polyester-film-side surface of the test specimen was fixed to a fixture of a high-speed peeling testing machine, and the 25-μm-thick polyester film constituting the test specimen was pulled at 90 degrees at a tensile speed of 15 m/min to tear the foam base. The maximum strength which occurred when the foam base constituting the test specimen was torn was measured.

[Tensile Strength of Foam Base]

The tensile strengths of the foam base in the machine and width directions were measured in accordance with JIS K6767. Specifically, a foam base having a gage line length of 2 cm and a width of 1 cm was subjected to a tensile testing machine TENSILON under conditions of 23° C. and 50% RH at a tensile speed of 300 mm/min. The maximum strength that occurred in the measurement was considered to be the tensile strength of the foam base.

[25%-Compressive Strength of Foam Base]

The 25%-compressive strength of the foam base was measured in accordance with JIS K6767. Specifically, the foam base was cut into square samples of 25 per side, and the samples were stacked on top of one another such that the total thickness of the samples reached about 10 mm. The samples were interposed between stainless steel boards having an area larger than the area of the samples and subsequently compressed at 23° C. at a speed of 10 mm/min. Then, the strength of the samples was measured when the total thickness of the samples was reduced by about 2.5 mm (which corresponds to 25% of the original thickness).

[Measurement of Average Bubble Diameter of Foam Base]

The foam base was cut into a piece having a size of 1 cm in both width and machine directions. A region around the center of each cross section of the piece of the foam base which contained a foam bubble was magnified using a digital microscope (product name "KH-7700", produced by HYRAX Co., Ltd.) by 200 times, and a cross section of the foam base which was taken in the width or machine direction was observed all over the length of the cross section of the foam base in the thickness direction. In each magnified image, the diameters of all the bubbles that were present in a region of the cross section which had an actual length of 2 mm in the machine or width direction were measured, and the average thereof was calculated as an average bubble diameter. The average bubble diameter was determined on the basis of the results measured at 10 random positions.

[Ease of Dismantling]

1) The double-sided adhesive tapes prepared in Examples and Comparative Examples were each cut into two pieces having a length of 2 cm (i.e., machine direction of the foam base) and a width of 1 cm, and the two pieces of the double-sided adhesive tape were bonded around the center of a polycarbonate board having a length of 2.5 cm, a width of 4.0 cm, and a thickness of 2 mm with an interval of 2 cm in the width direction.

2) An edge of a polyethylene terephthalate film having a length of 20 cm, a width of 1.5 cm, and a thickness of 50 μm was fixed to the rear surface of the polycarbonate board which was opposite to the side on which the tapes were adhered, and the polyethylene terephthalate film was wound around the polycarbonate board such that the polyethylene terephthalate film intersected the two pieces of the double-sided adhesive tape. The center of the polyethylene terephthalate film in the width direction was adjusted so as to coincide with the center of the two pieces of double-sided adhesive tape.

3) The polycarbonate board including the polyethylene terephthalate film which was wound around and fixed to the polycarbonate board was then bonded and fixed onto the surface of an aluminium board having a length of 20 cm and a width of 20 cm such that the pieces of the double-sided adhesive tape were brought into contact with the aluminium plate, and pressure bonding was performed using a 2-kg weight. The resulting multilayer body was left standing at 23° C. and 50% RH for 72 hours to prepare a test specimen.

4) An edge of the polyethylene terephthalate film of the test specimen was pulled in a direction perpendicular to the aluminium board to separate the polycarbonate board from the test specimen, and the state of the pieces of the double-sided adhesive tape in which separation occurred was observed.

Excellent: Interlaminar fluctuation and separation occurred in the foam base over the entirety (100%) of the double-sided adhesive tape.

Good: Interlaminar fluctuation and separation occurred in the foam base in 90% or more and less than 100% of the double-sided adhesive tape.

Poor: Interlaminar fluctuation and separation occurred in the foam base in less than 90% of the double-sided adhesive tape.

[Ease of Separation]

An edge of a residual object of the test specimen (double-sided adhesive tape) which remained after the test of ease of dismantling was pinched and slowly separated from the test specimen in a direction inclined at 135° at 600 mm/min manually. The state of the residual object being separated and removed was observed.

Excellent: The entirety (100%) of the residual object of the double-sided adhesive tape was separated and removed.

Good: 90% or more and less than 100% of the residual object of the double-sided adhesive tape was separated and removed.

Fair: 50% or more and less than 90% or less of the residual object of the double-sided adhesive tape was separated and removed.

Poor: Less than 50% of the residual object of the double-sided adhesive tape was separated and removed.

[Impact Resistance Test]

Figure 2:
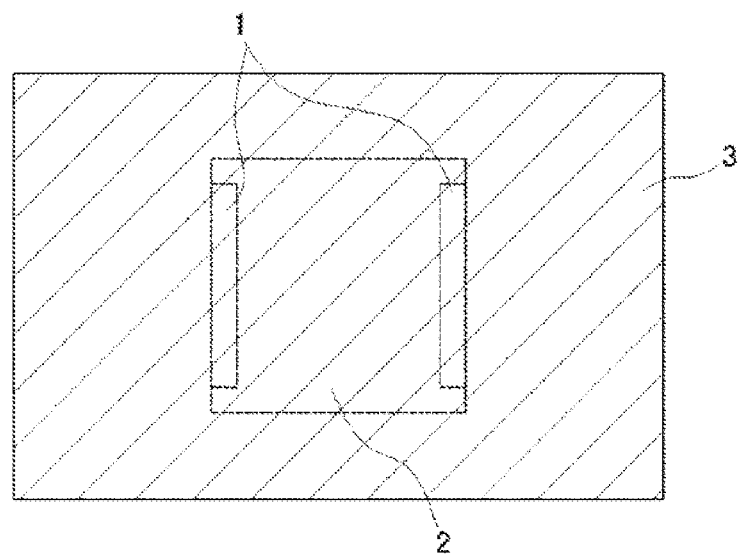
FIG. 2 is a conceptual diagram illustrating a test specimen used in an impact resistance test, which is viewed from the top surface of the test specimen.

1) Two double-sided adhesive tapes having a length of 40 mm and a width of 5 mm were bonded to an acrylic board (trade name "ACRYLITE L" produced by MITSUBISHI RAYON CO., LTD., hue: transparent) having a thickness of 2 mm and outer dimension of 50 mm×50 mm so as to be parallel to each other at an interval of 40 mm such that the weak-adhesion surfaces of the two double-sided adhesive tapes were brought into contact with the acrylic board (FIG. 1). The resulting acrylic board was bonded to the center of an ABS board (trade name: "Tough Ace R", produced by Sumitomo Bakelite Co., Ltd., hue: natural, no embossing) having a thickness of 2 mm and outer dimensions of 150 mm×100 mm (FIG. 2). Pressure bonding was performed with one stroke of a 2-kg roller, and the resulting multilayer body was left standing at 23° C. for 1 hour to prepare a test specimen.

Figure 3:
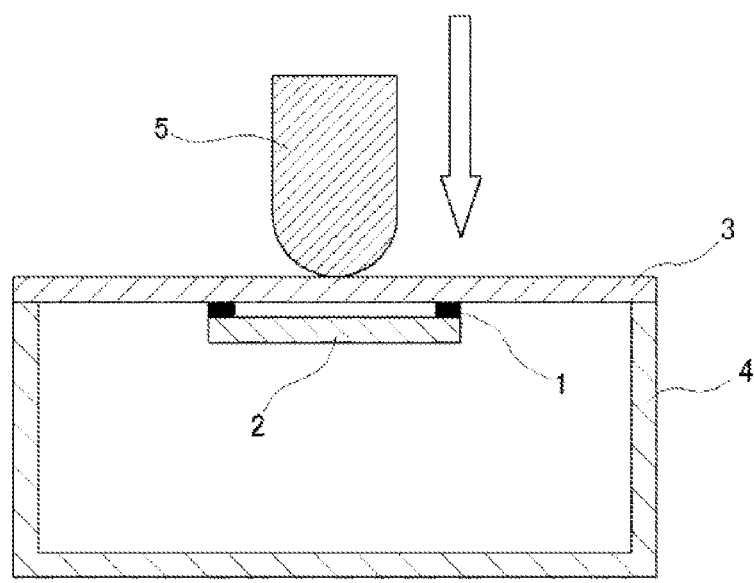
FIG. 3 is a conceptual diagram illustrating a method for conducting an impact resistance test.

2) A U-shaped measurement stage (thickness: 5 mm, made of aluminium) having a length of 150 mm, a width of 100 mm, and a height of 45 mm was placed on a base of a DuPont impact tester (produced by TESTER SANGYO CO,. LTD.). The test specimen was placed on the U-shaped measurement stage with the upper surface of the acrylic board facing downward (FIG. 3). A stainless steel hammer having a diameter of 25 mm and a mass of 300 g was dropped from the ABS-board side at the center of the ABS board. The height from which the hammer was dropped was gradually changed at intervals of 10 cm, and the hammer was dropped 5 times at intervals of 10 seconds for each height. Then, the height from which the hammer was dropped at which separation or fracture of the tape was confirmed in the test specimen was measured.

Good: Neither separation nor fracture of the tape occurred even when the hammer was dropped from a height exceeding 60 cm.

Poor: Separation or fracture of the tape occurred when the hammer was dropped from a height of 60 cm or less.

TABLE 1

| | | | Example 1 | Example 2 | Example 3 | Example 4 | Example 5 |
|---|---|---|---|---|---|---|---|
| Foam | Type | | (1) | (1) | (1) | (2) | (3) |
| | Thickness | [μm] | 100 | 100 | 100 | 80 | 100 |
| | Apparent density | [g/cm³] | 0.40 | 0.40 | 0.40 | 0.40 | 0.45 |
| | Interlaminar strength | [N/cm] | 12.6 | 12.6 | 12.6 | 10.2 | 16.2 |
| | 25%-Compressive strength | [kPa] | 103 | 103 | 103 | 92 | 190 |
| Tensile strength | Machine direction | [N/cm³] | 1084 | 1084 | 1084 | 1062 | 964 |
| | Width direction | [N/cm³] | 790 | 790 | 790 | 962 | 861 |
| Tensile elongation | Machine direction | % | 508 | 508 | 508 | 465 | 490 |
| | Width direction | % | 224 | 224 | 224 | 211 | 299 |
| Average bubble diameter | Thickness direction | [μm] | 20 | 20 | 20 | 9 | 25 |
| | Machine direction | [μm] | 126 | 126 | 126 | 117 | 121 |
| | Width direction | [μm] | 143 | 143 | 143 | 225 | 158 |
| Resin film | Resin film thickness | [μm] | 6 | 6 | 6 | 6 | 6 |
| | Bonding-agent layer thickness | [μm] | 4 | 4 | 4 | 4 | 4 |
| Adhesive | Type | | A | A | A | A | A |
| | Coating thickness (foam side) | [μm] | 15 | 15 | 45 | 15 | 15 |
| | Coating thickness (resin-film side) | [μm] | 25 | 15 | 45 | 15 | 25 |
| | 180°-Peel adhesion | [N/20 mm] | 12.0 | 12.0 | 12.0 | 12.0 | 12.0 |
| | Overall tape thickness | [μm] | 150 | 140 | 200 | 120 | 150 |
| | Ease of dismantling | | Excellent | Excellent | Excellent | Excellent | Good |
| | Ease of separation | | Excellent | Excellent | Excellent | Excellent | Excellent |
| | Impact resistance | | Good | Good | Good | Good | Good |

TABLE 2

| | | | Example 6 | Example 7 | Example 8 | Example 9 | Example 10 |
|---|---|---|---|---|---|---|---|
| Foam | Type | | (3) | (4) | (1) | (1) | (1) |
| | Thickness | [μm] | 100 | 140 | 100 | 100 | 100 |
| | Apparent density | [g/cm³] | 0.45 | 0.40 | 0.40 | 0.40 | 0.40 |
| | Interlaminar strength | [N/cm] | 16.2 | 19.1 | 12.6 | 12.6 | 12.6 |
| | 25%-Compressive strength | [kPa] | 190 | 130 | 103 | 103 | 103 |
| Tensile strength | Machine direction | [N/cm³] | 964 | 994 | 1084 | 1084 | 1084 |
| | Width direction | [N/cm³] | 861 | 713 | 790 | 790 | 790 |
| Tensile elongation | Machine direction | % | 490 | 535 | 508 | 508 | 508 |
| | Width direction | % | 299 | 344 | 224 | 224 | 224 |
| Average bubble diameter | Thickness direction | [μm] | 25 | 33 | 20 | 20 | 20 |
| | Machine direction | [μm] | 121 | 147 | 126 | 126 | 126 |
| | Width direction | [μm] | 158 | 174 | 143 | 143 | 143 |

TABLE 2-continued

|  |  |  | Example 6 | Example 7 | Example 8 | Example 9 | Example 10 |
|---|---|---|---|---|---|---|---|
| Resin film | Resin film thickness | [μm] | 6 | 6 | 3 | 16 | 6 |
|  | Bonding agent layer thickness | [μm] | 4 | 4 | 4 | 4 | 4 |
| Adhesive | Type |  | A | A | A | A | B |
|  | Coating thickness (foam side) | [μm] | 45 | 25 | 15 | 15 | 15 |
|  | Coating thickness (resin-film side) |  | 45 | 25 | 28 | 25 | 25 |
|  | 180°-Peel adhesive force | [N/20 mm] | 12.0 | 12.0 | 12.0 | 12.0 | 13.7 |
|  | Overall tape thickness | [μm] | 200 | 200 | 150 | 160 | 150 |
|  | Ease of disassembly |  | Good | Excellent | Excellent | Good | Good |
|  | Ease of peeling |  | Excellent | Excellent | Good | Excellent | Excellent |
|  | Impact resistance |  | Good | Good | Good | Good | Good |

TABLE 3

|  |  |  | Comparative example 1 | Comparative example 2 | Comparative example 3 | Comparative example 4 | Comparative example 5 |
|---|---|---|---|---|---|---|---|
| Foam | Type |  | (5) | (6) | (1) | (4) | (1) |
|  | Thickness | [μm] | 100 | 100 | 100 | 140 | 100 |
|  | Apparent density | [g/cm³] | 0.33 | 0.50 | 0.40 | 0.40 | 0.40 |
|  | Interlaminar strength | [N/cm] | 8.9 | 13.6 | 12.6 | 19.1 | 12.6 |
|  | 25%-Compressive strength | [kPa] | 70 | 270 | 103 | 130 | 103 |
| Tensile | Machine direction | [N/cm³] | 799 | 1456 | 1084 | 994 | 1084 |
| strength | Width direction | [N/cm³] | 627 | 956 | 790 | 713 | 790 |
| Tensile | Machine direction | % | 458 | 656 | 508 | 535 | 508 |
| elongation | Width direction | % | 254 | 304 | 224 | 344 | 224 |
| Average | Thickness direction | [μm] | 27 | 31 | 20 | 33 | 20 |
| bubble | Machine direction | [μm] | 189 | 94 | 126 | 147 | 126 |
| diameter | Width direction | [μm] | 189 | 369 | 143 | 174 | 143 |
| Resin film | Resin film thickness | [μm] | 6 | 6 | 6 | 6 | — |
|  | Bonding-agent layer thickness | [μm] | 4 | 4 | 4 | 4 | — |
| Adhesive | Type |  | A | A | C | D | A |
|  | Coating thickness (foam side) | [μm] | 15 | 15 | 15 | 30 | 25 |
|  | Coating thickness (resin-film side) | [μm] | 25 | 25 | 25 | 20 | 25 |
|  | 180°-Peel adhesion | [N/20 mm] | 12.0 | 12.0 | 8.9 | 8.9 | 12.0 |
|  | Overall tape thickness | [μm] | 150 | 150 | 150 | 200 | 150 |
|  | Ease of dismantling |  | Excellent | Poor | Poor | Poor | Excellent |
|  | Ease of separation |  | Excellent | Excellent | Excellent | Excellent | Poor |
|  | Impact resistance |  | Poor | Good | Good | Good | Good |

As shown in Examples 1 to 10 above, the double-sided adhesive tape according to the present invention achieved high drop-impact resistance of adherends, ease of dismantling (i.e., likelihood of interlaminar cracking), and ease of separating residual objects of the tape. In contrast, the double-sided adhesive tapes prepared in Comparative Examples 1 to 5 failed to achieve the sufficient drop-impact resistance, ease of dismantling (i.e., likelihood of interlaminar cracking), and ease of separating residual objects of the tape.

REFERENCE SIGNS LIST

1 DOUBLE-SIDED ADHESIVE TAPE
2 ACRYLIC BOARD
3 ABS BOARD
4 U-SHAPED MEASUREMENT STAGE
5 HAMMER

The invention claimed is:
1. A double-sided adhesive tape comprising: a polyolefin foam base; a resin film disposed on a surface of the polyolefin foam base; an adhesive layer disposed on a surface of the resin film; an adhesive layer disposed on another surface of the polyolefin foam base; and a bonding-agent layer interposed between the polyolefin foam base and the resin film and dry-laminated so as to bond the foam base and the resin film to each other by a dry lamination method, the polyolefin foam base having a thickness of 250 μm or less, a density of 0.45 g/cm³ or less and a maximum strength of 10 N/cm or more, the adhesive layer having a 180°-peel adhesion of 10 N/20 mm or more, the 180°-peel adhesion of the adhesive layer being measured at a peeling speed of 300 mm/min when an adhesive tape including a 25-μm-thick polyethylene terephthalate base and a 25-μm-thick adhesive layer disposed on the polyethylene terephthalate base is bonded to an aluminium board under conditions of a temperature of 23° C. and a relative humidity of 65% RH by pressing the adhesive tape against the aluminium board with one stroke of a 2-kg roller, the adhesive tape is left standing for 1 hour under conditions of a temperature of 23° C. and a relative humidity of 50% RH, and subsequently the adhesive tape is left standing for 1 hour under conditions of a temperature of 23° C. and a relative humidity of 50% RH, wherein the maximum strength is measured by pulling the polyolefin foam base having a width of 1 cm at a tensile speed of 15 m/min to tear the foam base in a thickness direction of the polyolefin foam base such that the maximum strength occurs when the foam base is torn.

2. The double-sided adhesive tape according to claim 1, having an overall thickness of 300 μm or less.

3. The double-sided adhesive tape according to claim 1, wherein the foam base has a tensile strength of 500 to 1300 N/cm$^2$.

4. The double-sided adhesive tape according to claim 1, wherein the resin film includes a polyester resin.

5. The double-sided adhesive tape according to claim 1, wherein the bonding-agent layer includes a urethane resin.

6. The double-sided adhesive tape according to claim 1, being used for fixing parts of electronic equipment to one another.

7. The double-sided adhesive tape according to claim 1, wherein the thickness of the polyolefin foam base is 50 to 250 μm.

8. The double-sided adhesive tape according to claim 1, wherein the thickness of the polyolefin foam base is 80 to 200 μm.

* * * * *